Dec. 11, 1962 J. C. THOM 3,067,525
TERRAIN RADAR SIMULATION
Filed Nov. 25, 1960 2 Sheets-Sheet 1

INVENTOR.
JOSEPH C. THOM
BY Edward A. Robinson
Attorney

Dec. 11, 1962  J. C. THOM  3,067,525
TERRAIN RADAR SIMULATION
Filed Nov. 25, 1960  2 Sheets-Sheet 2

INVENTOR.
JOSEPH C. THOM
BY Edward A. Robinson
Attorney

`United States Patent Office`

3,067,525
Patented Dec. 11, 1962

3,067,525
TERRAIN RADAR SIMULATION
Joseph C. Thom, Sunnyvale, Calif., assignor to General Precision, Inc., Binghamton, N.Y., a corporation of Delaware
Filed Nov. 25, 1960, Ser. No. 71,523
6 Claims. (Cl. 35—10.4)

This invention relates to equipment for training personnel in the operation of aircraft radar equipment, and more specifically, this invention relates to apparatus wherein a simulated radar display of terrain appears as in a moving aircraft flying over such terrain.

In training personnel in the art of aircraft navigation and the like, grounded apparatus has been used because of its economy in time and material and because hazards of airborne training are eliminated. Such apparatus may include a unit which simulates and represents an airplane with a seat(s) for a student(s) positioned relative to an instrument panel with a complement of instruments similar to the instruments of an actual aircraft. The training apparatus contemplated by this invention provides a simulated radar display of the terrain with controls for simulating a clearance plane.

A radar display of terrain may somewhat resemble an optical projection or map of the terrain, but in certain respects the radar display distorts the map and is not a true optical projection. For example, various objects or targets which are of equal "slant range" from the aircraft will appear superimposed upon the radar scope or display monitor. Thus, if the aircraft approaches a hill or mountain, the base of the mountain may have the same slant range with respect to the aircraft as the peak of the mountain since the base of the mountain is relatively close in the horizontal direction but more distant in the vertical direction while the mountain peak may be distant horizontally but close in elevation. In such a case the radar return from both the base and the peak of the mountain may be simultaneous and will therefore cause a single intensified "blip" or spot as a terrain feature on the radar display.

An aircraft radar may also provide a clearance plane display. In such a display all terrain features which lie below an arbitrary clearance plane will not appear on the display and only those features such as mountain peaks would have an elevation above the clearance plane will appear on the radar scope.

It is an object of this invention to provide an improved radar simulation apparatus having a means for scanning a relief map and having pick-up and display means as in a closed circuit television system.

A further object of this invention is to provide an improved radar simulation system wherein rates of scanning of a pick-up device and a monitor device may be varied as a function of each other such that terrain features of a monitor display will simulate a slant range distortion as in an actual aircraft radar.

Another object of this invention is to provide a simulated radar system having a clearance plane controllable by the operator to produce a simulated radar return of only those features of relief having an elevation exceeding that of the clearance plane.

Numerous other objects and advantages will be apparent throughout the progress of the specification which follows. The accompanying drawings illustrate a certain selected embodiment of the invention and the views therein are as follows.

Figure 1:
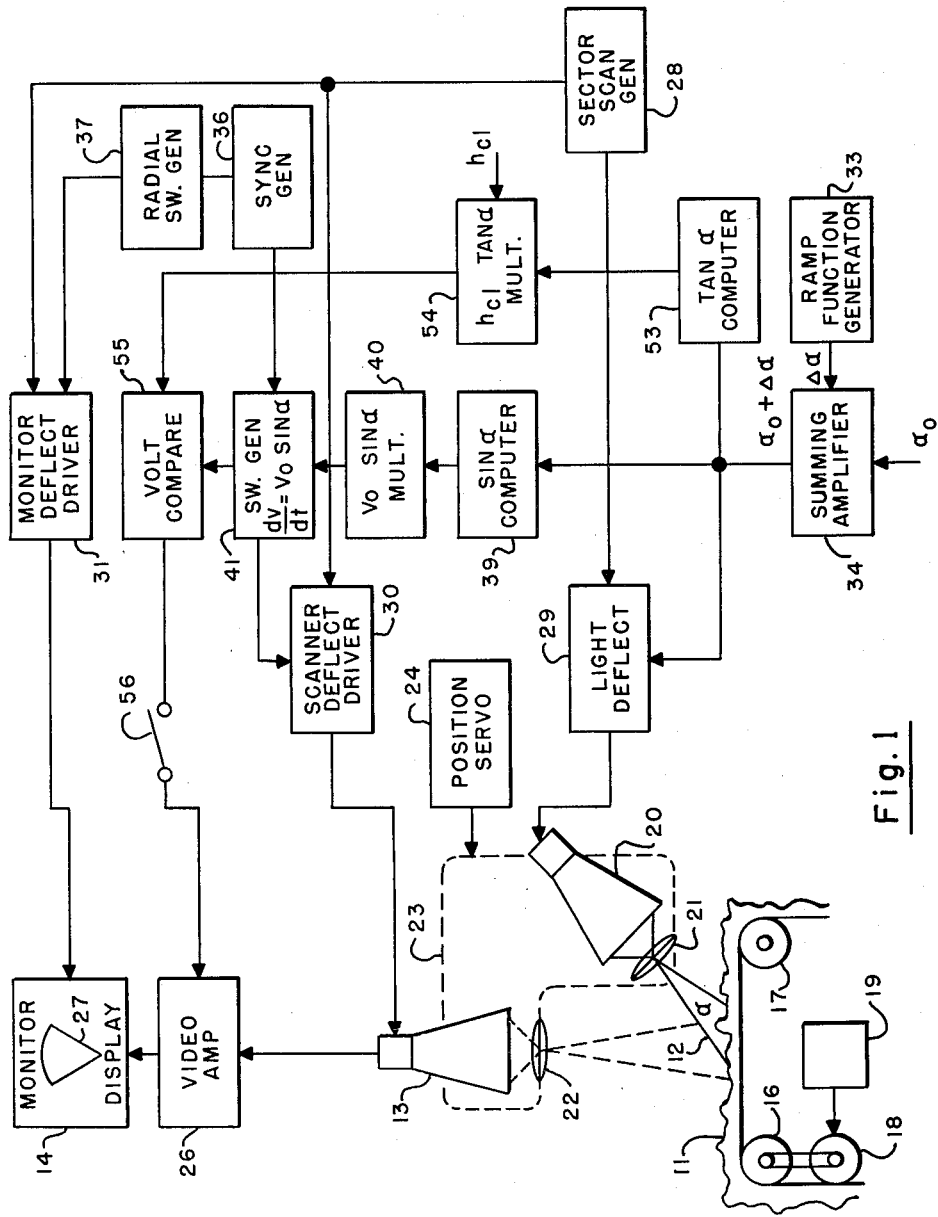
FIGURE 1 is a schematic diagram of the radar simulation system of this invention.

Briefly stated, according to this invention, a relief map of terrain 11 is scanned by a light beam 12 and the scanning spot illumination so produced is picked up by means such as a vidicon camera 13 to generate a video signal. The video signal is re-produced by a monitor 14 which may include a cathode ray display tube. The beam of light 12 scans the terrain relief model 11 at a relatively slow rate as compared to the scanning in the vidicon 13 and the monitor 14. The vidicon scanning rate is controlled by analog means such that it equals the product of the scanning rate of the monitor and a sinodial function of the instantaneous angle, $\alpha$, of the light beam. Because of the trigonometry involved, the simulated radar display of the monitor corresponds to the slant range of the terrain from the light scanning source in a manner similar to the echo display of a radar. A simulated clearance plane control is provided by blanking the video channel of the monitor and the pick-up device during times when the angle of scan of the light beam becomes great. More specifically, the product of the clearance plane height (the vertical distance from the simulated aircraft down to the arbitrary clearance plane) and the tangent of the light beam scanning angle will cause the monitor to be blanked for the terminal part of each scan of the light beam.

Referring to FIGURE 1 in greater detail, a terrain model 11 may be composed of a material such as silicon rubber which is fabricated in layers corresponding to the contours of a terrain area. This relief map will display the hills and valleys and other contour features in scaled relief while maintaining flexibility to permit movement as a belt over rollers or pulleys 16 and 17. A drive roller 16 may be mechanically coupled to a motor 18 which is controlled by a servomechanism 19. A flying spot scanner 20 may include a cathode ray tube for generating a scanning spot of light which is focused upon the relief map by optical means or lens system 21.

The flying spot scanner 20, the lens 21, the vidicon pick-up device 13 and a lens or optical system 22 associated therewith are mounted together on a carriage shown schematically in dashed lines 23 and be moved as a unit by a position servo 24. Movement of the aircraft across terrain is simulated when the flexible relief map or belt 11 is moved by the motor 18, and a lateral movement which may simulate drift from a desired flight path may be accomplished by the servo 24 which shifts the carriage 23 transversely with respect to the belt 11. The carriage 23 must therefore be capable of transverse movement with respect to the belt 11 and will further be arranged to move toward or away from the belt to simulate changes in the aircraft elevation. It will become apparent that the aircraft will simulate a position corresponding to that of the lens or optical system 21 with respect to the terrain features in relief on the moving map 11. In addition to moving transversely and in elevation with respect to the moving relief map 11, the carriage 23 may rotate or tilt to simulate a flight angle and/or climb angle of the aircraft.

The signals from the vidicon pick-up device 13 are passed to a video amplifier 26 and thence to the display monitor 14 which includes a cathode ray tube 27 similar to or identical with an actual aircraft radar display tube. In actual aircraft radar a fan shaped beam scans through a sector at a relatively slow rate such as 180° of scan per second. A sector scanning generator 28 provides a low frequency scanning wave corresponding to the sector scanning of actual aircraft radar. This scanning generator may be identical to an actual radar scanning generator wherein a capacitor builds up a voltage slowly by accumulation of charge. The sector scanning wave is passed to a light beam deflection circuit 29 coupled to the flying spot scanner 20, to a scanning deflection wave driver 30 coupled to the vidicon pick-up device 13, and to a monitor deflection wave driver 31 which is coupled to the monitor display 14. Thus, all three of the scanning devices are driven simultaneously by the sector scan generator 28 and are caused to scan through identical sectors simultaneously.

All three devices, 13, 14 and 20 scan at the slow sector scanning rate (approximately 180° per second) and simultaneously scan at various faster rates along the lines of the sector. The flying spot scanner creates a beam of light which scans sector lines upon the relief map 11 at an intermediate rate which may be 180 scans per second. A ramp function generator 33 generates deflection waves for the flying spot scanner which are coupled thereto through a summing amplifier circuit 34 and the light beam deflection driver circuit 29. As the beam of light 12 scans outwardly along the relief map, the angle, $\alpha$, is subtended by the beam. This angle $\alpha$ may be substantially zero at the beginning of the line sweep and increases to a pre-determined value which may approach 90°. The summing amplifier 34 receives two inputs: a constant signal representative of $\alpha_0$ which may be generated by a control such as a voltage dividing potentiometer and which is manually operated; and the general triangular wave of the ramp function generator 33 which may be deemed to be $\Delta\alpha$ and varies as the beam sweeps. Obviously, the output of the summing amplifier 34 will be a signal representative of the sweep angle $\alpha$, since $\alpha = \alpha_0 + \Delta\alpha$. This signal is passed directly to the light beam deflection circuit 29 to cause the scanning of the various lines of the sector by the flying spot scanner. The signal repersentative of $\alpha$ is also passed to computer circuitry which will modify the scanning to the pick-up device 13 and the monitor display 14 in accordance with the instantaneous value of the subtended angle, $\alpha$.

While the flying spot scanner scans each line at the intermediate scanning rate, the vidicon pick-up device 13 and the display monitor 14 will scan the lines at a higher scanning rate which may be of the order of 15,000 scans per second. The display monitor 14 may scan at a constant line rate determined by a synchronizing signal generator 36, while the scanning rate of the vidicon pick-up device 13 will scan at a modified rate for reasons to be discussed subsequently. The synchronizing signal generator 36 passes synchronizing signals to a radial sweep generator 37 which generates deflection waves of a 15 kilocycle frequency.

Figure 2:
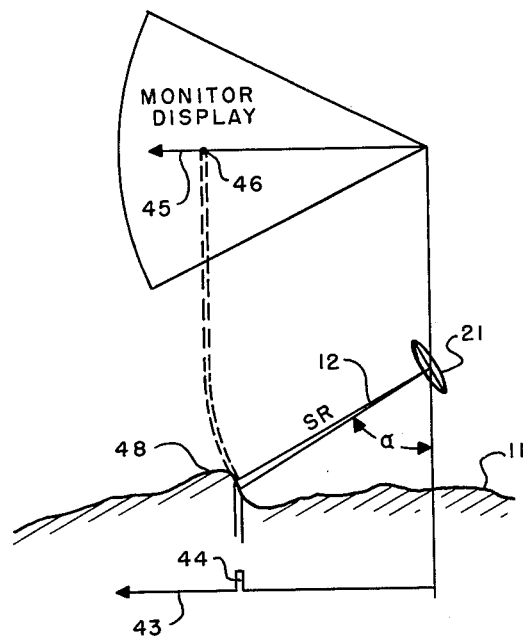
FIGURE 2 is a diagram illustrating the geometry of the scanning and pick-up systems as related to the monitor display.

The monitor deflection driver 31 receives both the sector scan wave from the generator 28 and the high frequency radial scanning waves from the generator 37, and causes the electron beam of the display monitor to scan a raster of many radial lines as a sector is swept once by the spot of light from the flying spot scanner 20. While the synchronous signal generator 36 establishes a constant line scanning rate in the monitor display device 14, it is necessary that the line scanning in the vidicon pick-up device 13 be modified in accordance with the instantaneous angle $\alpha$ subtended by the light beam 12 for reasons which will become clear subsequently when the geometry of FIGURE 2 is considered. As previously indicated, the summing circuit 34 generates an output signal corresponding to the angle $\alpha$ and a computer circuit 39 receives the signal and generates therefrom a signal corresponding to the sine of $\alpha$. The sine function computer 39 may be a diode bridge circuit shown and described on pages 90 and 91 in the textbook "Analog Methods in Computation and Simulation" by Walter W. Soroka, published in 1954 by the McGraw-Hill Book Company, Inc. A multiplier circuit 40 receives the sin $\alpha$ function and introduces a scaling factor of $V_0$ such that the function $V_0 \sin \alpha$ is generated. The factor $V_0$ will normally be a constant signal level representative of the velocity of scanning in the monitor display device 14 which as stated previously is a constant value. The multiplier circuit may be an operational amplifier having a controllable gain such that the factor $V_0$ is provided by the gain adjustment. A sweep generator circuit 41 receives synchronizing pulses from the circuit 36 and generates deflection waves which may provide a linear sweep of the electron beam in the vidicon device 13, but the velocity of the sweep is determined by the value of the function $V_0 \sin \alpha$ from the multiplier 40. Thus, it may be appreciated that the circuit 41 may be a conventional capacitor integrating circuit wherein the deflection waves generated will be synchronized by pulses from the circuit 36 but will have a slope and an amplitude controlled by the circuit 40. These deflection waves are passed to the vidicon deflection driver circuit 30 and are passed together with the sector scanning waves to the vidicon pick-up device 13.

FIGURE 2 illustrates the geometry of the radar simulation of terrain by the scanning of the relief map 11. The lens 21 from the flying spot scanner corresponds with the position of an aircraft over the terrain represented by the relief map 11 for any given sector line, the light beam 12 sweeps outwardly from an initial position $\alpha_0$ which may be the vertical. During each sweep of the light beam 12, the vidicon pick-up device 13 will make repeated scans along the same sector lines, and will generate a video signal therefrom. The successive scans of the vidicon are indicated by an arrow 43 and the video signal established in each scan will be a voltage pulse 44 resulting when the video scan passes the spot illuminated by the light beam 12. While the vidicon is scanned as indicated by the arrow 43, the monitor display device scans as indicated by an arrow 45. The monitor display device scans at a constant rate, $V_0$, but the vidicon pick-up device scans at a rate dependent upon the trigometric function of the angle $\alpha$ subtended by the light beam 12. Thus, while the velocity of the monitor scanning is $V_0$, the velocity of the vidicon scanning is $V_0 \sin \alpha$ and as the angle $\alpha$ increases, the linear scanning rate in the vidicon likewise increases. Thus, for the geometry as shown in FIGURE 2 the signal voltage pulse 44 is generated by the vidicon at a position which is less than the point of display 46 shown in the monitor device. This decreased rate of scanning in the vidicon causes the vidicon to intercept the spot of light from the beam 12 at a distance which is somewhat foreshortened as compared with the display indication 46 of the monitor.

The difference in the linear scanning rates between the monitor display device 14 and the vidicon pick-up device 13 introduces a distortion in the output display which is equivalent to the slant range distortion of an actual radar display. It may be appreciated from the trigometric of FIGURE 2 that the location of the display spot 46 on the monitor corresponds to the slant range, SR, indicated by the length of the subtended light beam 12. It may also be appreciated that the position of the voltage pulse 44 on the vidicon scanning line 43 corresponds to the product of the slant range, SR, and the sine of the angle $\alpha$. During the initial portion of the sweep of the light beam 12, the angle $\alpha$ will be slight, therefore the sine of $\alpha$ will be slight and the vidicon will scan at a very slow rate and a short distance as compared to the constant rate and complete scan of the monitor display 14. As the angle $\alpha$ increases in value, the scanning rate of the vidicon likewise increases in accordance with the sine function of the angle $\alpha$ whereby the scanning rate of the vidicon will approach the scanning rate of the monitor, $V_0$, as the angle $\alpha$ approaches 90°.

The optical distortion introduced to effect a slant range simulation by introducing a trigometric function into the scanning rate, provides an additional feature in the simulated radar display. This feature provides the adding of targets of equal slant range. For example, let us assume as shown by FIGURE 2 that the flying spot scanner lense, or simulated aircraft 21, is approaching a hill or mountain 48 which has generally concave slope from the approach side as shown in FIGURE 2. It may be noted that the base of the mountain 48 has aproximately the same slant range as the peak of the mountain with respect to the lens 21. If an actual aircraft approached a mountain having such a configuration the various reflected returns from different points on the mountain would arrive simultaneously and a single, intense blip or spot would appear on the radar display. In other words, the entire slope of the mountain 48 from base to peak may have approximately the same slant range and will therefore result in a very small but very bright blip or spot 46 upon the radar display. The radar simulating apparatus of this invention will likewise cause a strong or reinforced spot to appear at the display point 46 because the slant range is accurately simulated. Thus, as the light beam 12 slowly sweeps upon the side of the mountain 48, both the vidicon pick-up device 13 and the monitor display 14 will scan the sector line several times for each scanning of the light beam. The time required for the vidicon to scan to the illuminated spot on the mountain side will be the same as the angle $\alpha$ increases, and therefore, the identical point 46 of the display will be reinforced by each scanning of the vidicon and the monitor.

A further feature of this scanning arrangement lies in the fact that a true shadow effect is produced behind terrain features such as mountain ranges or hills. In actual aircraft radar, the areas behind obstacles are shadowed by the obstacles themselves to produce blank areas on the radar display. Likewise the obstacles on the relief map of this invention will cast shadows by interrupting the light beam 12, and therefore, the shadow effect will appear on the mountain display in a manner identical with the shadow effect of an actual aircraft radar.

Figure 3:
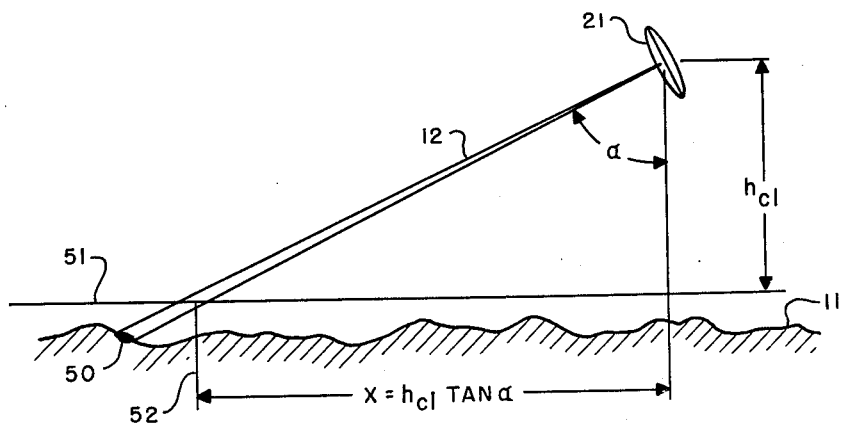
FIGURE 3 is a further diagram illustrating the geometry of the scanning system as related to the clearance plane control.

FIGURE 3 illustrates the geometry of a further feature of this invention—that of a clearance plane mode of operation. The clearance plane is established at a simulated height, $h_{cl}$, below the simulated aircraft or the lens 21. Since the scanning of the light beam 12 is at a very slow rate as compared with the scanning of monitor display 14 and the vidicon pick-up 13, the angular position $\alpha$ of the light beam may be considered constant during the time of any particular line scan of the devices 13 and 14. If we assume that $x$ represents the horizontal distance from the simulated aircraft or lines 21 then we may establish the trigometric relation that $x$ equals the height $h$ multiplied by the tangent of $\alpha$ giving the horizontal distance to the spot of light intercept 50. Obviously, from the configuration of FIGURE 3 we may note that the light spot 50 lies below the clearance plane designated as 51, and therefore, should not appear on the monitor display. This is accomplished by applying a blanking signal to the video channel coupled between the vidicon device 13 and the minitor 14. The blanking signal is established at the time when $x$ is equal to or greater than $h_{cl}$ tan $\alpha$. Thus, when the vidicon scans from the vertical to a point 52 equal to $h_{cl}$ tan $\alpha$ any video signal picked up will be displayed by the monitor, but subsequent to the point 52 the pick-up device 13 and/or the monitor 14 is blanked preventing the display of any video signal which may result from a spot of light at a distance in excess to that of the point 52.

Referring to FIGURE 1, a computer circuit 53 receives the signal representative of $\alpha$ and develops therefrom a signal representative of the function tan $\alpha$. The tangent function computer 53 may be a diode bridge circuit as shown and described on pages 90 and 91 of Soroka's textbook, supra. A multiplying circuit 54 receives the function tan $\alpha$ from the circuit 53 and introduces a constant scaling factor, $h_{cl}$. The value of $h_{cl}$ is constant for any given simulation problem and may be entered manually from a potentiometer adjustment or the multiplier 54 may be an operational amplifier wherein the scaling factor, $h_{cl}$, may be entered as a gain adjustment. A voltage comparison circuit 55 receives both the signal representative of $h_{cl}$ tan $\alpha$ from the circuit 54 and the deflection wave from the sweep generator 41. The voltage comparison circuit 55 may be a differential amplifier which provides a blanking signal to the video amplifier 26 whenever the instantaneous value of the deflection wave from the sweep generator 41 exceeds the $h_{cl}$ tan $\alpha$ signal from the circuit 54. A switch 56 is provided to establish the clearance plane mode of operation, to pass the blanking signals to the video amplifier. Obviously, the blanking signal could be applied to the monitor display device 14 or to the vidicon pick-up device 13 as well as the video channel 36 therebetween.

Changes may be made in the form, construction and arrangement of the parts without departing from the spirit of the invention or sacrificing any of its advantages, and the right is hereby reserved to make all such changes as fall fairly within the scope of the following claims.

What is claimed is:

1. Apparatus for simulating a radar display of terrain comprising a relief map, a means for generating a scanning beam of light positioned to scan the relief map obliquely, a light sensitive pick-up means for generating a video signal from the scanned relief map, a monitor means coupled to receive the video signal and operable to develop a visual display therefrom, a deflection wave generating means coupled to the monitor means for establishing a constant scanning rate therein, and another deflection wave generating means coupled to the pick-up means for establishing a scanning rate therein which is an analog function of the scanning angle of the beam of light.

2. Apparatus for simulating a radar display of terrain comprising a relief map, a means for generating a scanning beam of light positioned adjacent to the relief map whereby the light beam scans the relief map at varying oblique angles, a pick-up means for generating a video signal from the scanned relief map, a monitor means coupled to receive the video signal and operable to develop a visual display therefrom, a deflection wave generating means coupled to the monitor means to establish constant scanning rate therein, another deflection wave generating means coupled to the pick-up means for establishing a scanning rate therein and an analog means coupled to both deflection wave generating means and operable to control the rate of scanning of the pick-up means whereby the pick-up means is caused to scan at a rate equal to the product of the scanning rate of the monitor means and a trigonometric function of the oblique angle of the light beam.

3. Apparatus for simulating a radar display of terrain comprising a relief map, a means for generating a scanning beam of light positioned to scan the relief map at varying oblique angles, a light sensitive scanning means positioned to scan the relief map and operable to generate a video signal therefrom, a monitor display means electrically coupled to receive the video signal and operable to develop a visual display therefrom, a clearance plane computing circuit, and a blanking means sensitive to the clearance plane computing circuit and to the oblique angle scanned by the light beam, said blanking means being operable to blank the video signal when the scan of the light sensitive scanning means exceeds a value which is a trigonometric function of the oblique angle of the beam of light computed by the clearance plane computing circuit.

4. Apparatus for simulating a radar display of terrain comprising a relief map, a means for generating a scanning beam of the light positioned adjacent to the relief map whereby the light beam scans the relief map at a variable angle $\alpha$, a pick-up means for generating a video signal from the scanned relief map, a monitor means coupled to receive the video signal and operable to develop a visual display therefrom, a deflection wave generating means coupled to the monitor means to establish a constant scanning rate $V_0$ therein, another deflection wave generating means coupled to the pick-up means for establishing a scanning rate therein and an analog means coupled to both deflection wave generating means and operable to cause the pick-up means to scan at a variable function equal to the product of the scanning rate $V_0$ multiplied by the sine of the angle $\alpha$.

5. Apparatus for simulating a radar display of terrain comprising a relief map, a means for generating a scanning beam of light positioned to scan the relief map at a variable angle $\alpha$, a light sensitive scanning means positioned to scan the relief map and operable to generate a video signal therefrom, a monitor display means electrically coupled to receive the video signal and operable to develop a visual display therefrom, a deflection wave generating means coupled to the monitor display means for establishing a constant scanning rate $V_0$ therein, another deflection wave generating means coupled to the pick-up means for establishing a scanning rate therein equal to $V_0$ multiplied by the sine of the angle $\alpha$, a clearance plane computing circuit, including analog means for comparing the product of $V_0$ multiplied by the sine of the angle $\alpha$ and the product of a vertical clearance height, $h_{\text{cl}}$, multiplied by the tangent of the angle $\alpha$, and a blanking means coupled to the clearance plane computing circuit and operable to blank the video signal when $V_0 \sin \alpha$ exceeds $h_{\text{cl}} \tan \alpha$.

6. Apparatus for simulating a radar display of terrain comprising a relief map, a light beam scanning means operable to generate a beam of light and to scan the relief map therewith at an angle, a light sensitive scanning means positioned to scan the relief map and operable to generate a video signal therefrom, a monitor scanning means electrically coupled to receive the video signal and operable to generate a visual display therefrom, a first deflection wave driving means coupled to the light sensitive scanning means, a second deflection wave driving means coupled to the monitor scanning means, and an analog computting means responsively coupled to the light beam scanning means and controllably coupled to one of the deflection wave drive means whereby the rate of scan of monitor scanning means and the light sensitive scanning means are unequal by an analog function of the angle of the beam of light.

References Cited in the file of this patent

UNITED STATES PATENTS

| | | |
|---|---|---|
| 2,413,633 | Jones | Dec. 31, 1946 |
| 2,516,069 | Newhouse et al. | July 18, 1950 |
| 2,841,886 | Cutler | July 8, 1958 |
| 2,924,026 | Domeshek | Feb. 9, 1960 |
| 2,941,311 | Rosenfeld et al. | June 21, 1960 |
| 2,973,587 | Kaplan et al. | Mar. 7, 1961 |

FOREIGN PATENTS

| | | |
|---|---|---|
| 805,294 | Great Britain | Dec. 3, 1958 |